(12) United States Patent
Figler et al.

(10) Patent No.: US 8,740,746 B2
(45) Date of Patent: Jun. 3, 2014

(54) METHOD FOR CONTROLLING THE POWER TRANSMISSION IN A DRIVE TRAIN AND DRIVE TRAIN

(75) Inventors: Thomas Figler, Bochum (DE); Markus Kley, Ellwangen (DE); Alexander Wunsch, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 111 days.

(21) Appl. No.: 13/133,971

(22) PCT Filed: Dec. 11, 2009

(86) PCT No.: PCT/EP2009/008892
§ 371 (c)(1),
(2), (4) Date: Aug. 3, 2011

(87) PCT Pub. No.: WO2010/066452
PCT Pub. Date: Jun. 17, 2010

(65) Prior Publication Data
US 2011/0294621 A1     Dec. 1, 2011

(30) Foreign Application Priority Data
Dec. 12, 2008 (DE) .......................... 10 2008 061 711

(51) Int. Cl.
*F02B 33/44* (2006.01)
*F02D 23/00* (2006.01)

(52) U.S. Cl.
USPC ................. 477/32; 477/33; 60/598; 60/605.1

(58) Field of Classification Search
USPC .................................. 477/32, 33; 60/598–611
See application file for complete search history.

(56) References Cited

U.S. PATENT DOCUMENTS 2,444,456 A * 7/1948 Lysholm .......................... 60/609
4,444,014 A * 4/1984 Kobayashi et al. ............. 60/608
(Continued)

FOREIGN PATENT DOCUMENTS

| DE | 3 224 006 | 12/1983 |
| DE | 32 24 008 | 12/1983 |

(Continued)

OTHER PUBLICATIONS

Search Report dated Oct. 22, 2012 in corresponding Chinese Application No. 200980149990.2.

(Continued)

*Primary Examiner* — Tisha Lewis
(74) *Attorney, Agent, or Firm* — Faegre Baker Daniels LLP

(57) ABSTRACT

The invention relates to a method for controlling the power transmission in a drive train, in particular of a motor vehicle, wherein the drive train comprises: an internal combustion engine which drives an output shaft at an engine speed and generates an exhaust gas stream; an exhaust gas turbine which is arranged in the exhaust gas stream and is engaged in or can be switched to a drive connection with the output shaft in order to transmit the drive power of the exhaust gas turbine to the output shaft; a compressor which is arranged in a fresh air stream supplied to the internal combustion engine and which is engaged in and driven by a drive connection with the exhaust gas turbine in order to charge the internal combustion engine at a predefined charging pressure; a power-controlled hydrodynamic clutch, which is arranged in the drive connection between the exhaust gas turbine and the output shaft and by means of which drive power of the exhaust gas turbine is transmitted to the output shaft depending on the power controller, and which has a primary wheel that is driven by the exhaust gas turbine and a secondary wheel that is driven hydrodynamically by the primary wheel and in turn drives the output shaft. The method according to the invention for controlling the power transmission in a drive train, in particular of a motor vehicle, controls the power transmission of the hydrodynamic clutch depending on certain input variables.

26 Claims, 2 Drawing Sheets

(56) References Cited

U.S. PATENT DOCUMENTS

| | | |
|---|---|---|
| 4,452,043 A | 6/1984 | Wallace |
| 5,713,204 A | 2/1998 | Kadlicko |
| 5,729,978 A | 3/1998 | Hiereth et al. |
| 6,886,337 B2 | 5/2005 | Frierich et al. |
| 7,976,653 B2 | 7/2011 | Anflo et al. |

FOREIGN PATENT DOCUMENTS

| | | |
|---|---|---|
| DE | 44 29 855 | 8/1995 |
| DE | 102 90 840 | 7/2007 |
| EP | 1 390 323 | 7/2007 |
| GB | 820096 | 9/1959 |
| WO | 01/98641 | 12/2001 |

OTHER PUBLICATIONS

International Search Report dated Mar. 17, 2010 in PCT/EP2009/008892.

Written Opinion dated Mar. 17, 2010 in PCT/EP2009/008892.

* cited by examiner

METHOD FOR CONTROLLING THE POWER TRANSMISSION IN A DRIVE TRAIN AND DRIVE TRAIN

CROSS-REFERENCE TO RELATED APPLICATION

This application is related to and claims the benefit under 35 U.S.C. §119 and 35 U.S.C. §365 of International Application No. PCT/EP2009/008892, filed Dec. 11, 2009, the disclosure of which is expressly incorporated herein by reference.

The present invention relates to a method for controlling the power transmission in a drive train, especially of a motor vehicle, in detail with the features according to the preamble of claim 1 and a drive train especially of a motor vehicle according to the preamble of claim 6.

BACKGROUND

1. Field of the Invention

Vehicle drive trains with a turbo-charged and mechanically charged (supercharged) internal combustion engine are well-known to the person skilled in the art and are also known as turbocharger-turbocompound systems. During turbocharging, a compressor which compresses the fresh air supplied to the internal combustion engine is driven by means of an exhaust gas turbine which is arranged in the exhaust gas stream of the internal combustion engine. The drive connection between the exhaust gas turbine and the compressor is usually a purely mechanical one, as also advantageously according to the present invention.

2. Description of the Related Art

In the case of a turbocompound, the drive power of the mentioned or an additional exhaust gas turbine in the exhaust gas stream of the internal combustion engine is added to the mechanical drive power of the internal combustion engine in that the exhaust gas turbine drives the crankshaft of the internal combustion engine at least indirectly. A hydrodynamic coupling is usually arranged for reducing the torsional oscillations in the drive connection between the exhaust gas turbine and the crankshaft.

Although the mentioned turbocharger-turbocompound systems can improve the efficiency of the drive train in many load ranges, the known systems come with the disadvantage that load ranges can also occur in which the overall system has a worse efficiency and/or more unfavorable emissions than comparable systems without turbocharger and without turbocompound.

The present invention is based on the object of providing a drive train and a method for controlling the power transmission in a drive train, especially a motor vehicle drive train, in which the mentioned disadvantages are avoided. In particular, a strategic control shall be created which optimizes the utilization of existing powers for improving the efficiency in the overall load profile.

SUMMARY

The object in accordance with the invention is achieved by a method with the features of claim 1 and a drive train with the features of claim 6. Advantageous and especially appropriate embodiments of the invention are provided in the dependent claims.

The method in accordance with the invention can be applied to a drive train, especially a motor vehicle drive train, which comprises both turbocharging and also mechanical charging by means of a turbocompound. The drive train therefore comprises an internal combustion engine which drives an output shaft at an engine speed $n_{motor}$ and produces an exhaust gas stream. Furthermore, an exhaust gas turbine, which is also known as an exhaust gas power turbine, is arranged in the exhaust gas stream, which exhaust gas turbine is in a drive connection with the output shaft or can at least optionally be switched into such a connection in order to transmit drive power of the exhaust gas turbine onto the output shaft of the internal combustion engine. In accordance with the invention this shall be understood as being not only the direct transmission of the drive power of the exhaust gas turbine onto the output shaft of the internal combustion engine, but also any load state in which the drive power of the exhaust gas turbine is added up to the drive power of the internal combustion engine in order to drive the drive train, especially the drive wheels of a motor vehicle.

A compressor, which is usually a turbocompressor, is arranged in a fresh air stream supplied to the internal combustion engine, which compressor is in a drive connection with the exhaust gas turbine and is driven by the same in order to charge the internal combustion engine with a predetermined charging pressure $p_{BP}$. This type of turbocharging is known to the person skilled in the art and therefore need not be explained in further detail. It is understood that the compressor according to a first embodiment is in continual and especially purely mechanical drive connection with the exhaust gas turbine or is switchable into such a drive connection according to an alternative embodiment, in that a respective coupling is provided between the exhaust gas turbine and the compressor. It is also possible to provide a further drive unit such as an electric motor for driving the compressor in addition to the "exhaust gas turbine" drive unit.

A power-controlled hydrodynamic coupling is provided in the drive connection between the exhaust gas turbine and the output shaft. The description of the power-controlled hydrodynamic coupling shall be understood within the terms of the present invention in such a way that a control of the torque transmitted by means of the hydrodynamic coupling is also included, with a respective power transmission being obtained by a respectively obtained speed.

As a result, drive power of the exhaust gas turbine is transmitted hydrodynamically onto the output shaft by means of the hydrodynamic coupling, which occurs depending on the current power control in order to thereby transmit drive power of the exhaust gas turbine onto the primary wheel of the hydrodynamic coupling, from there hydrodynamically to the secondary wheel of hydrodynamic coupling and from there output shaft. It is understood that such operating states can also occur in which the secondary wheel of the hydrodynamic coupling is driven by the output shaft of the internal combustion engine at a higher speed than the primary wheel of the hydrodynamic coupling revolves. In such an operating state there is a hydrodynamic power transmission from the secondary wheel of the hydrodynamic coupling to the primary wheel of the hydrodynamic coupling depending on the currently provided power control. Since the primary wheel of the hydrodynamic coupling which is connected to the exhaust gas turbine at least indirectly, especially purely mechanically, is also in a drive connection, especially also a purely mechanical drive connection, with the compressor arranged in the fresh air stream, it is possible in the latter mentioned operating state to transmit drive power hydrodynamically from the output shaft of the internal combustion engine, which is also known as a crankshaft, to the compressor in order to drive the same and charge the internal combustion engine.

A bypass is advantageously provided in the exhaust gas stream parallel to the exhaust gas turbine which optionally can be opened and closed in order to guide exhaust gas optionally passed the exhaust gas turbine. The term of bypass shall be understood in accordance with the invention in such a way that both an emission of the exhaust gas stream guided past the exhaust gas turbine to the ambient environment and a renewed feeding into an exhaust gas line behind the exhaust gas turbine shall be included. It is possible to control the drive power which the exhaust gas turbine generates from the exhaust gas energy by opening and closing the bypass. It is also possible to provide another possibility according to one embodiment of the invention instead of or in addition to the provision and opening or closing of the bypass in order to adjust or control the power input of the exhaust gas turbine. For example, the exhaust gas turbine can be provided with a variable turbine geometry in order to control the power input of the exhaust gas turbine by adjusting the rotor blades and/or guide blades.

The following steps and are provided according to the method in accordance with the invention:

The speed $n_{motor}$ of the internal combustion engine is detected or calculated from at least one other detected variable. Furthermore, the speed $n_{cc}$ of the compressor is detected or calculated from at least one other detected variable. Moreover, the charging pressure $p_{BP}$ is detected or calculated from at least one other detected variable.

A reference charging pressure $p_{BP\_soll}$ and a limit speed $n_{Grenz}$ for the compressor shall be predetermined. Both variables can be predetermined as a constant value according to an especially simple embodiment. At least the reference charging pressure is predetermined in a variable or dynamic manner in an especially advantageous way. The constant or variable (dynamic) predetermination of the reference charging pressure $p_{BP\_soll}$ occurs depending on at least one parameter of the internal combustion engine which describes the current (actual) operating state or the one to be set. Such a parameter is the current or maximally possible output of the internal combustion engine for example, the current or the maximally possible torque, the current speed of the internal combustion engine, the gas state and the like.

It is principally also possible to describe the charging of the internal combustion engine by a value other than the charging pressure. For example, another reference variable describing the charging state of the internal combustion engine can be predetermined alternatively or in addition, and accordingly a variable other than the charging pressure which describes the charging of the internal combustion engine can be detected or calculated. The compressor speed (corresponding to the reference speed) or the pressure ratio via the compressor (in the case of a respective predetermination of a reference pressure ratio) shall be mentioned as examples for such other variables describing the charging of the internal combustion engine.

The power transmission in the drive train is optimized in accordance with the invention by controlling the hydrodynamic power transmission of the hydrodynamic coupling, which occurs in such a way that at least the four following conditions are always fulfilled:

1. If the speed of the secondary wheel of the hydrodynamic coupling is higher than the speed of the primary wheel, the charging pressure $p_{BP}$ is lower than the reference charging pressure $p_{BP\_soll}$ and the speed $n_{cc}$ of the compressor is lower than the limit speed $n_{Grenz}$, the power transmission in the hydrodynamic coupling is increased.
2. If the speed of the secondary wheel of the hydrodynamic coupling is higher than the speed of the primary wheel and either the charging pressure $p_{BP}$ is larger than the reference charging pressure $p_{BP\_soll}$ or the speed $n_{cc}$ of the compressor is higher than the limit speed $n_{Grenz}$, the power transmission in the hydrodynamic coupling is reduced.
3. If the speed of the secondary wheel of the hydrodynamic coupling is lower than the speed of the primary wheel, the charging pressure $p_{BP}$ is lower than the reference charging pressure $p_{BP\_soll}$ and the speed $n_{cc}$ of the compressor is lower than the limit speed $n_{Grenz}$, the power transmission in the hydrodynamic coupling is reduced.
4. If the speed of the secondary wheel of the hydrodynamic coupling is lower than the speed of the primary wheel and either the charging pressure $p_{BP}$ is larger than the reference charging pressure $p_{BP\_soll}$ or the speed $n_{cc}$ of the compressor is higher than the limit speed $n_{Grenz}$, the power transmission in the hydrodynamic coupling is increased and the bypass, if so provided, is advantageously opened simultaneously.

The method in accordance with the invention can also be provided without the optional opening and closing of a bypass, e.g. by another open-loop or close-loop control of the power input of the exhaust gas turbine. It is also possible however to omit such an open-loop or closed-loop control of the power input entirely. As has already been explained above, it is finally also possible to choose another variable instead of the charging pressure or the reference charging pressure which describes the charging or the charge state of the internal combustion engine.

In the case of the first two conditions, the bypass to the exhaust gas turbine is advantageously completely closed or the exhaust gas turbine is adjusted or controlled in such a way that it takes up the maximum possible power from the exhaust gas and converts the same into drive power. Under the second and the fourth condition, the charging pressure $p_{BP}$ can be larger than the reference charging pressure $p_{BP\_soll}$ and at the same time speed $n_{cc}$ of the compressor can be higher than the limit speed $n_{Grenz}$.

The power control (torque control) of the hydrodynamic coupling can occur in different ways which are known to the person skilled in the art. It occurs especially advantageously in accordance with the invention by changing the degree of filling of a working chamber formed by the primary wheel and the secondary wheel. As is known, the power transmission occurs in hydrodynamic couplings by way of a cycle flow of a working medium in the working chamber between the bladed wheels, usually from the primary wheel to the secondary wheel, and according to the present invention in specific operating states also from the secondary wheel to the primary wheel. If the working chamber can be discharged completely or in a substantially complete manner, the power transmission can also be interrupted completely.

In accordance with an advantageous embodiment, a temperature-dependent control (power control or torque control) of the hydrodynamic coupling is provided. The temperature of the working medium, especially an oil, of the hydrodynamic coupling is detected for this purpose at a suitable location or is calculated from another detected variable. If an external working medium cycle is provided for the hydrodynamic coupling, it is possible for example to detect the working medium temperature behind the working chamber in the direction of flow of the working medium, i.e. the working medium which has left the working chamber and especially the hydrodynamic coupling. If the temperature exceeds a predetermined temperature limit value, it can be determined that the hydrodynamic coupling is being operated at the point of the highest power loss. By partly filling or discharging the coupling or the working chamber of the hydrodynamic coupling it is then possible to reduce the power loss of the hydrodynamic coupling and thus also the temperature of the working medium in the hydrodynamic coupling or behind the hydrodynamic coupling. The decision whether the working chamber is to be filled or discharged can be made depending on the measure by means of which a comparatively better overall efficiency of the internal combustion engine or the drive train is achieved.

In accordance with an alternative embodiment, the power control or torque control of the hydrodynamic coupling occurs in such a way that an flow restrictor, especially an annular slide valve, is introduce more less into the cycle flow of the working medium in the working chamber. The stronger the cycle flow is disturbed thereby, the stronger the reduction in the power transmission or the transmitted moment. If a respective flow restrictor is provided for disturbing the cycle flow, the hydrodynamic coupling can be arranged to be filled at all times in one embodiment, especially arranged in a fully filled manner, i.e. there is always a predetermined maximum quantity of working medium in the working chamber at all times. Alternatively, the coupling can also be dischargeable in order to interrupt the power transmission completely. In this case too, the degree of filling of the working chamber with working medium is not adjustable in a purposeful manner, which means that no control of the filling is provided. It is understood that it is possible according to a further embodiment to combine a filling control with an flow restrictor for optional disturbance of the cycle flow in the working chamber.

A drive train in accordance with the invention is characterized in that a control apparatus is provided which controls the power transmission or the torque transmission in the hydrodynamic coupling. The control apparatus is provided with one or several data inputs which receive the speed of the internal combustion engine, the speed of the compressor, the charging pressure and a predetermined reference charging pressure as input variables and provide them to the control apparatus for further processing. The presently described method in accordance with the invention is performed by the control apparatus depending on these input variables, in that it accesses the hydrodynamic coupling in a controlling manner, e.g. via a filling control or the drive of an flow restrictor, and opens or closes the bypass around the exhaust gas turbine. Instead of the charging pressure or the reference charging pressure, or in addition to the same, another variable can be used which describes the charging state of the internal combustion engine.

It is alternatively or additionally possible to detect the mentioned variables during the operation of the drive train in a non-continuous manner, but to store characteristics and/or at least one characteristic diagram in the control apparatus, from which the necessary variables for control in accordance with the invention can be derived. Such characteristics or such a characteristic diagram can be produced from tests on test stands for example, or the respective characteristic diagram or characteristics can be produced when starting up a learning system. For example, the characteristic diagram can provide the mentioned input variables depending on the current engine output, especially depending on the current engine torque and the current engine speed as input variables for setting the power transmission in accordance with the invention. Accordingly, the term of input variable of the control apparatus shall be understood in a respectively wide way.

It is understood that input variables can also be provided electronically by a control device, especially a vehicle control device.

The invention will be described below by reference to an exemplary embodiment. Individual details shown in the drawing and described below can be implemented not only in combination but also individually or in individual groups, wherein:

BRIEF DESCRIPTION OF THE DRAWINGS

FIG. 1 shows a possible drive train in accordance with the invention, comprising an internal combustion engine 1 with an output shaft 1.1. The internal combustion engine is cooled by means of a cooling water circuit 12, which is known to the person skilled in the art and need not be explained in further detail.

DETAILED DESCRIPTION

Figure 1:
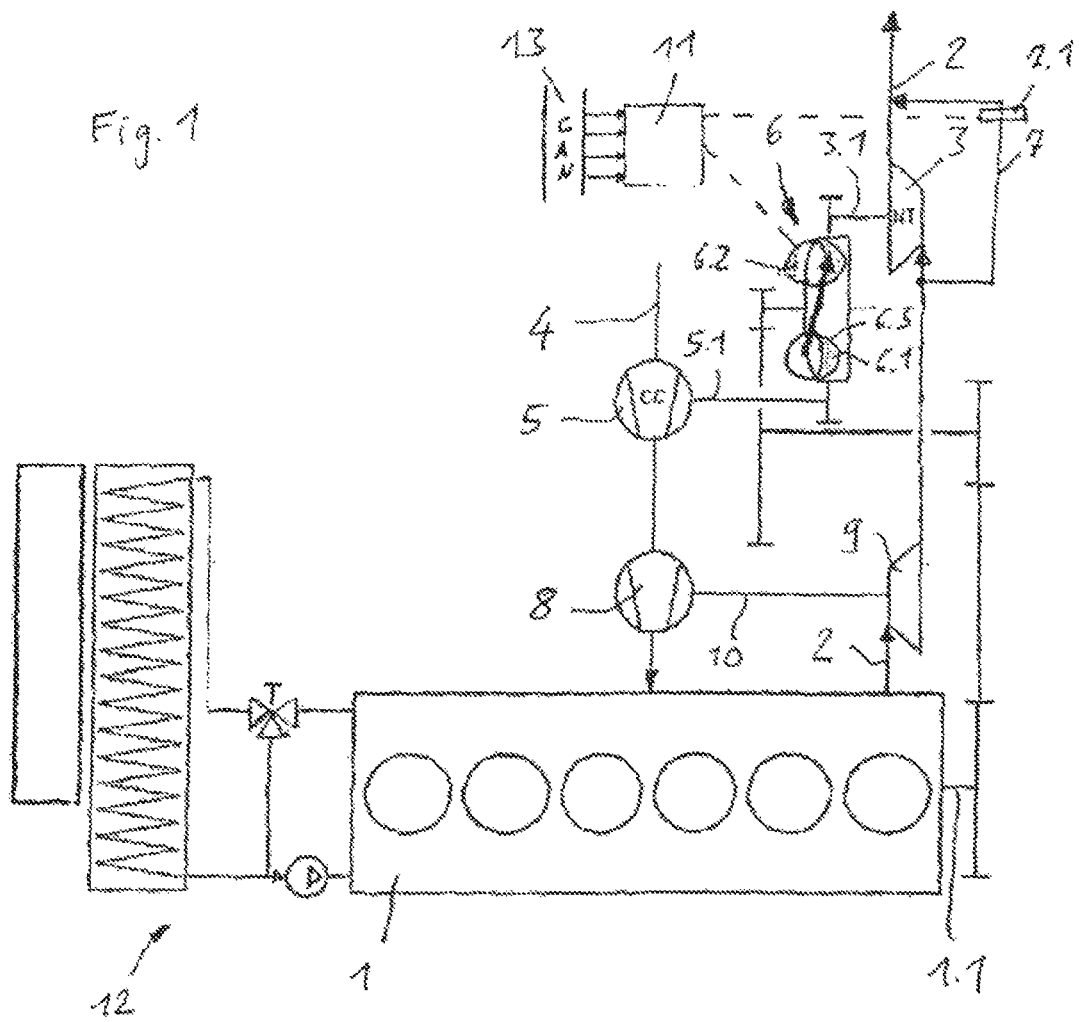
FIG. 1 shows a schematic exemplary arrangement of the various components of a drive train arranged in accordance with the invention.

The internal combustion engine 1 produces an exhaust gas stream 2, in which presently two exhaust gas turbines, namely the first exhaust gas turbine 3 and the second exhaust gas turbine 9, are arranged in series with respect to each other and are supplied with exhaust gas in such a way that they convert exhaust gas energy into drive power. In this case, the second exhaust gas turbine 9 is arranged before the first exhaust gas turbine 3 in the direction of flow of the exhaust gas and drives a compressor, which in this case is designated as second compressor 8, which compresses fresh air of a fresh air stream 4 and supplies the same to the internal combustion engine 14 charging the same. In this case, the second compressor 8 is connected via a common shaft 10 with the second exhaust gas turbine 9, or the respective blade wheels of the compressor 8 and the exhaust gas turbine 9 which are each arranged as turbomachines are carried by the common shaft 10. The compressor 8 further represents a high-pressure stage, whereas the exhaust gas turbine 9 represents a low-pressure stage.

A first compressor 5 is provided in the direction of flow of the fresh air in the fresh air stream 4 before the second compressor 8, which first compressor represents a low-pressure stage and is driven by means of the first exhaust gas turbine 3. The illustrated drive connection is a purely mechanical drive connection, in the present case by a shaft 3.1 of the exhaust gas turbine 3 via a gearwheel, especially a spur-gear stage, onto the primary wheel 6.1 of the hydrodynamic coupling 6, via a second gearwheel stage, which is again arranged as a spur-gear stage, and further onto the shaft 5.1 of the compressor 5 which then rotatably carries the respective blade wheel of the compressor 5.

The exhaust gas turbine 3 is simultaneously connected via the hydrodynamic coupling 6 in a drive connection with the output shaft 1.1 of the internal combustion engine 1, which occurs in such a way that the drive connection is guided via the working chamber 6.3 or the flow circuit of working medium in the working chamber 6.3, and thereby the hydrodynamic power transmission is provided which dampens the torsional oscillations.

The power transmission with the hydrodynamic coupling 6 can be controlled for example by purposeful changing of the degree of filling of the working chamber 6.3 of the hydrodynamic coupling 6, both the power transmitted in a first operating state by the output shaft 1.1 via the hydrodynamic coupling 6 onto the compressor 5 and also the power in a second operating state which is transmitted by the exhaust gas turbine 3 via the hydrodynamic coupling 6 onto the output shaft 1.1. A control apparatus 11 is provided for the purposeful setting of the degree of filling in the working chamber 6.3, which control apparatus accordingly accesses the hydrodynamic coupling 6 in a controlling manner, such that it opens and/or closes a valve in the inlet into the working chamber 6.3 and/or a valve in the outlet of the working medium out of the working chamber 6.3, and especially moves the same in a controlling manner to a predetermined intermediate position (closed-loop control position).

The control apparatus 11 receives specific input variables, e.g. via a CAN bus 13, which are at least the speed $n_{motor}$ of the internal combustion engine 1, the speed $n_{cc}$ of the compressor 5, the charging pressure $p_{BP}$ with which the internal combustion engine once charged, which means the one that is set at the end of the fresh air stream 4, in this case behind the second compressor 8, and is introduced into the engine housing for combustion with a respective fuel, and further a predetermined reference charge compressor $p_{BP\_soll}$.

The control apparatus 11 determines further whether a bypass 7 to the exhaust gas turbine 3 for the exhaust gas of the exhaust gas stream 2 is opened or closed, e.g. in that it actuates a valve 7.1 or throttle or flap or the like in the bypass 7 or at a branch-off point or also at the point of the renewed unification with the exhaust gas line.

Figure 2:
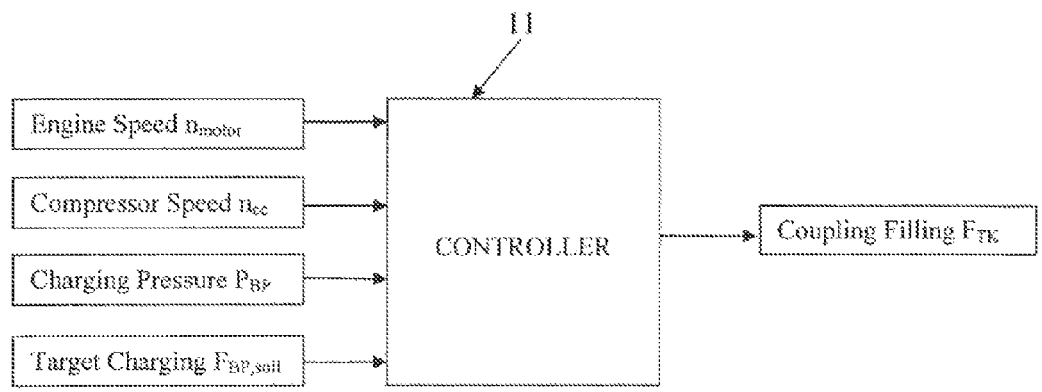
FIG. 2 schematically shows a control apparatus provided in accordance with the invention.

FIG. 2 shows an embodiment for the control apparatus 11 again and the input variables which are processed by the control apparatus 11 in order to cause the control of the filling of the coupling, which is designated in the present case as $F_{rK}$.

Figure 3:
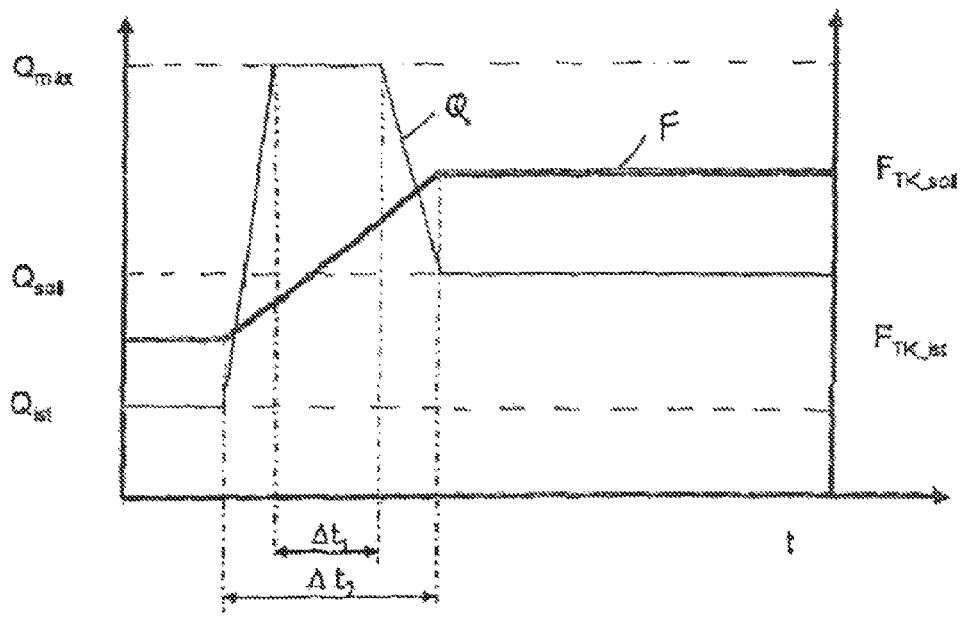
FIG. 3 shows an example for a control for changing the filling of the working chamber of the hydrodynamic coupling.

FIG. 3 shows an example for controlling the change in the filling of the working chamber of the hydrodynamic coupling in order to change the power transmitted by the hydrodynamic coupling or the transmitted moment. It is the goal of the advantageous control of the change in filling as described here to reduce the time for the change in filling, especially during the filling process, which means when comparatively more working medium is to be introduced into the working chamber. The drawing shows the opening cross-section or the associated working medium stream Q through the valve (not shown) into the working chamber, and the degree of filling F, both over time t.

An especially rapid filling can be achieved when, as is shown in FIG. 3, a maximum opening of a valve arranged in the inlet of the working medium into the working chamber is set for a short period of time and after the expiration of this predetermined short period of time an opening, which will be known herein as reference opening and is reduced with respect to the maximum opening, is set in which a predetermined reference volume flow flows through the working chamber, i.e. at first into the working chamber and then out of the same again. The duration of the maximum opening can be set in an especially advantageous manner as a function of the speed difference between the two blade wheels of the hydrodynamic coupling and/or the slip difference, which means the difference between the slip between the two blade wheels at the beginning of the change in the filling and the desired slip to be set on completing the change in filling, and/or the maximum volume flow through the valve. FIG. 3 shows this time period of maximum opening with $\Delta t1$ and can thus be calculated depending on the following function:

$$\Delta t1 = f(\Delta n, \Delta s, Q_{max\_Ventil})$$

Short-term overdriving is therefore provided which accelerates the change in filling. This overdriving is especially advantageous in the case of a so-called feed-controlled hydrodynamic coupling that is flowed through with constant discharge cross-section of the working medium.

Although FIG. 3 shows an advantageous change in filling within the terms of a stronger filling of the working chamber, respective overdriving can also be applied to a partial discharging of the working chamber when the valve is closed in the feed for a short period of time and thereafter is set to the desired reference opening. It is also possible in the case of a valve provided in the discharge for the working medium to provide respective overdriving in that the valve is opened completely for a short period of time during partial discharging and is then moved to the desired reference opening position, and/or it is closed for a short time during stronger filling before it is moved to the reference opening position.

The illustrated overdriving can also be provided in an increase in the output of the hydrodynamic coupling by introducing an flow restrictor into the working medium circuit in that the throttling is set at first in a comparatively stronger or weaker way and then to a predetermined reference value.

$\Delta t2$ designates the time of the change in filling in FIG. 3.

The invention claimed is:

1. A method for controlling the power transmission in a drive train, with the drive train comprising:
    an internal combustion engine which drives an output shaft with an engine speed ($n_{Motor}$) and produces an exhaust gas stream;
    an exhaust gas turbine arranged in the exhaust gas stream and is in a drive connection with the output shaft or can be switched into such a one in order to transmit drive power from the exhaust gas turbine onto the output shaft;
    a compressor which is arranged in the fresh air stream supplied to the internal combustion engine and which is in a drive connection with the exhaust gas turbine and is driven by the exhaust gas turbine in order to charge the internal combustion engine with a predetermined charging pressure ($p_{BP}$);
    a power-controlled hydrodynamic coupling which is arranged in the drive connection between the exhaust gas turbine and the output shaft and via which drive power of the exhaust gas turbine is transmitted onto the output shaft, the power controlled hydrodynamic coupling including a primary wheel driven by the exhaust gas turbine and a secondary wheel driven hydrodynamically by the primary wheel and drives the output shaft, the method comprising the following steps:
    determining the speed ($n_{Motor}$) of the internal combustion engine by one of: detecting the speed ($n_{Motor}$) and calculating the speed ($n_{Motor}$) from at least one other detected variable;
    determining a speed ($n_{cc}$) of the compressor by one of: detecting the speed ($n_{cc}$) and calculating the speed ($n_{cc}$) from at least one other detected variable;
    determining a variable describing the charging of the internal combustion engine by one of: detecting the variable describing the charging of the internal combustion engine and calculating the variable describing the charging of the internal combustion engine from at least one other detected variable;
    predetermining, depending on at least one parameter of an actual operating state or operating state to be set of the internal combustion engine and/or the exhaust gas stream, a reference variable describing the charging of the internal combustion engine and predetermining a limit speed ($n_{Grenz}$) for the compressor;

controlling the power of the hydrodynamic coupling in accordance with the following steps:

increasing the power transmission in the hydrodynamic coupling, if the speed of the secondary wheel of the hydrodynamic coupling is higher than the speed of the primary wheel, the variable describing the charging of the internal combustion engine is lower than the reference variable describing the charging of the internal combustion engine and the speed ($n_{cc}$) of the compressor is lower than the limit speed ($n_{Grenz}$);

reducing the power transmission of the hydrodynamic coupling, if the speed of the secondary wheel of the hydrodynamic coupling is higher than the speed of the primary wheel and either the variable describing the charging of the internal combustion engine is larger than the reference variable describing the charging of the internal combustion engine or the speed ($n_{cc}$) of the compressor is higher than the limit speed ($n_{Grenz}$);

reducing the power transmission of the hydrodynamic coupling, if the speed of the secondary wheel of the hydrodynamic coupling is lower than the speed of the primary wheel, the variable describing the charging of the internal combustion engine is lower than the reference variable describing the charging of the internal combustion engine, and the speed ($n_{cc}$) of the compressor is lower than the limit speed ($n_{Grenz}$);

increasing the power transmission in the hydrodynamic coupling, if the speed of the secondary wheel of the hydrodynamic coupling is lower than the speed of the primary wheel and either the variable describing the charging of the internal combustion engine is larger than the reference variable describing the charging of the internal combustion engine or the speed ($n_{cc}$) of the compressor is larger than the limit speed ($n_{Grenz}$).

2. A method according to claim 1, wherein if the speed of the secondary wheel of the hydrodynamic coupling is lower than the speed of the primary wheel and either variable describing the charging of the internal combustion engine is larger than the reference variable describing the charging of the internal combustion engine or the speed ($n_{cc}$) of the compressor is larger than the limit speed ($n_{Grenz}$) and the power transmission in the hydrodynamic coupling is increased, the method further comprises the step of reducing the power input of the exhaust gas turbine.

3. A method according to claim 1, wherein the step of controlling the power of the hydrodynamic coupling is effected by the step of changing a degree of filling of a working chamber which is formed by the primary wheel and the secondary wheel.

4. A method according to claim 3, further comprising the step of determining a temperature of the working medium of the hydrodynamic coupling by one of detecting the temperature and calculating the temperature from at least one other detected variable and the step of changing the degree of filling of the working chamber comprises one of additional filling and partial discharging upon exceeding a predetermined temperature limit value.

5. A method according to claim 1, wherein the step of controlling the power of the hydrodynamic coupling comprises the step of introducing a flow restrictor into a cycle flow of working medium in a working chamber formed by the primary wheel and the secondary wheel and which can be filled or is filled with working medium in order to disturb the cycle flow.

6. A method according to claim 1, further comprising the step of changing a degree of filling of a working chamber of the hydrodynamic coupling by the step of briefly maximally opening or closing a valve in the feed into the working chamber and/or a valve in the discharge out of the working chamber, and is thereafter brought to a predetermined reference opening position in order to effect a predetermined reference volume flow of working medium into the working chamber or out of the same in said reference opening position.

7. A method according to claim 1, wherein the drive train further comprises a second compressor arranged in the fresh air stream, behind the compressor in the direction of flow, and driven by means of a second exhaust gas turbine, via a common shaft, the exhaust gas turbine arranged in the exhaust gas stream, before the exhaust gas turbine in the direction of flow, the second compressor charging the internal combustion engine.

8. A method according to claim 2, wherein the step of controlling the power of the hydrodynamic coupling is effected by the step of changing a degree of filling of a working chamber which is formed by the primary wheel and the secondary wheel.

9. A method according to claim 2, wherein the step of controlling the power of the hydrodynamic coupling comprises the step of introducing a flow restrictor into a cycle flow of working medium in a working chamber formed by the primary wheel and the secondary wheel and which can be filled or is filled with working medium in order to disturb the cycle flow.

10. A method according to claim 2, further comprising the step of changing a degree of filling of a working chamber of the hydrodynamic coupling by the step of briefly maximally opening or closing a valve in the feed into the working chamber and/or a valve in the discharge out of the working chamber, and is thereafter brought to a predetermined reference opening position in order to effect a predetermined reference volume flow of working medium into the working chamber or out of the same in said reference opening position.

11. A method according to claim 3, further comprising the step of changing the degree of filling of the working chamber of the hydrodynamic coupling by the step of briefly maximally opening or closing a valve in the feed into the working chamber and/or a valve in the discharge out of the working chamber, and is thereafter brought to a predetermined reference opening position in order to effect a predetermined reference volume flow of working medium into the working chamber or out of the same in said reference opening position.

12. A method according to claim 4, further comprising the step of changing the degree of filling of the working chamber of the hydrodynamic coupling by the step of briefly maximally opening or closing a valve in the feed into the working chamber and/or a valve in the discharge out of the working chamber, and is thereafter brought to a predetermined reference opening position in order to effect a predetermined reference volume flow of working medium into the working chamber or out of the same in said reference opening position.

13. A method according to claim 2, wherein the drive train further comprises a second compressor arranged in the fresh air stream, behind the compressor in the direction of flow, and driven by means of a second exhaust gas turbine, via a common shaft, the exhaust gas turbine arranged in the exhaust gas stream, before the exhaust gas turbine in the direction of flow, the second compressor charging the internal combustion engine.

14. A method according to claim 3, wherein the drive train further comprises a second compressor arranged in the fresh air stream, behind the compressor in the direction of flow, and driven by means of a second exhaust gas turbine, via a common shaft, the exhaust gas turbine arranged in the exhaust gas stream, before the exhaust gas turbine in the direction of flow, the second compressor charging the internal combustion engine.

15. A method according to claim 4, wherein the drive train further comprises a second compressor arranged in the fresh air stream, behind the compressor in the direction of flow, and driven by means of a second exhaust gas turbine, via a common shaft, the exhaust gas turbine arranged in the exhaust gas stream, before the exhaust gas turbine in the direction of flow, the second compressor charging the internal combustion engine.

16. A method according to claim 5, wherein the drive train further comprises a second compressor arranged in the fresh air stream, behind the compressor in the direction of flow, and driven by means of a second exhaust gas turbine, via a common shaft, the exhaust gas turbine arranged in the exhaust gas stream, before the exhaust gas turbine in the direction of flow, the second compressor charging the internal combustion engine.

17. A method according to claim 6, wherein the drive train further comprises a second compressor arranged in the fresh air stream, behind the compressor in the direction of flow, and driven by means of a second exhaust gas turbine, via a common shaft, the exhaust gas turbine arranged in the exhaust gas stream, before the exhaust gas turbine in the direction of flow, the second compressor charging the internal combustion engine.

18. A drive train, comprising:
an internal combustion engine which drives an output shaft with an engine speed ($n_{Motor}$) and produces an exhaust gas stream;
an exhaust gas turbine arranged in the exhaust gas stream and is in a drive connection with the output shaft or can be switched into such a one in order to transmit drive power from the exhaust gas turbine onto the output shaft;
a compressor which is arranged in a fresh air stream supplied to the internal combustion engine and which is in a drive connection with the exhaust gas turbine and is driven by the exhaust gas turbine in order to charge the internal combustion engine with a predetermined charging pressure ($p_{BP}$);
a power-controlled hydrodynamic coupling which is arranged in the drive connection between the exhaust gas turbine and the output shaft and via which drive power of the exhaust gas turbine is transmitted onto the output shaft, the power-controlled hydrodynamic coupling including a primary wheel driven by the exhaust gas turbine and a secondary wheel driven hydrodynamically by the primary wheel and drives the output shaft; and
a controller operatively connected with the drive train, the controller, based on a speed ($n_{cc}$) of the compressor, a variable describing the charging of the internal combustion engine, a reference variable describing the charging of the internal combustion engine, and a predetermined limit speed ($n_{cc}$) of the compressor, alters a power transmission of the hydrodynamic coupling, the controller:
increases the power transmission in the hydrodynamic coupling, if the speed of the secondary wheel of the hydrodynamic coupling is higher than the speed of the primary wheel, the variable describing the charging of the internal combustion engine is lower than the reference variable describing the charging of the internal combustion engine and the speed ($n_{cc}$) of the compressor is lower than the limit speed ($n_{Grenz}$);
reduces the power transmission of the hydrodynamic coupling, if the speed of the secondary wheel of the hydrodynamic coupling is higher than the speed of the primary wheel and the variable describing the charging of the internal combustion engine is larger than the reference variable describing the charging of the internal combustion engine or the speed ($n_{cc}$) of the compressor is higher than the limit speed ($n_{Grenz}$);
reduces the power transmission of the hydrodynamic coupling, if the speed of the secondary wheel of the hydrodynamic coupling is lower than the speed of the primary wheel, the variable describing the charging of the internal combustion engine is lower than the reference variable describing the charging of the internal combustion engine, and the speed ($n_{cc}$) of the compressor is lower than the limit speed ($n_{Grenz}$); and
increases the power transmission in the hydrodynamic coupling, if the speed of the secondary wheel of the hydrodynamic coupling is lower than the speed of the primary wheel and either the variable describing the charging of the internal combustion engine is larger than the reference variable describing the charging of the internal combustion engine or the speed ($n_{cc}$) of the compressor is larger than the limit speed ($n_{Grenz}$).

19. The drive train according to claim 18, further comprising:
a bypass provided in the exhaust gas stream parallel to the exhaust gas turbine and can be opened and closed optionally in order to guide exhaust gas past the exhaust gas turbine, the controller reduces the power input of the exhaust gas turbine by opening the bypass to guide exhaust gas past the exhaust gas turbine if the speed of the secondary wheel of the hydrodynamic coupling is lower than the speed of the primary wheel and either the variable describing the charging of the internal combustion engine is larger than the reference variable describing the charging of the internal combustion engine or the speed ($n_{cc}$) of the compressor is larger than the limit speed ($n_{Grenz}$) and the power transmission in the hydrodynamic coupling is increased.

20. A drive train according to claim 18, further comprising a second exhaust gas turbine arranged in the exhaust gas stream, in the direction of flow before the exhaust gas turbine, the second exhaust gas turbine in a drive connection, via a common shaft, with a second compressor in order to charge the internal combustion engine, the second compressor arranged in the fresh air stream, behind the compressor in the direction of flow.

21. The method according to claim 1, wherein said step of determining the variable describing the charging of the internal combustion engine comprises the step of determining a charging pressure ($p_{BP}$) and wherein the variable describing the charging of the internal combustion engine comprises the charging pressure ($p_{BP}$).

22. The method according to claim 1, wherein said step of predetermining a reference variable describing the charging of the internal combustion engine comprises the step of predetermining a reference charging pressure ($p_{BP\_soll}$) and wherein the reference variable describing the charging of the internal combustion engine comprises the reference charging pressure ($p_{BP\_soll}$).

23. The method of claim 2, wherein said step of reducing the power input of the exhaust gas turbine comprises the step of opening a bypass which is provided in the exhaust gas stream parallel to the exhaust gas turbine and can be opened and closed optionally in order to guide exhaust gas past the exhaust gas turbine.

24. The method of claim 2, wherein said step of reducing the power input of the exhaust gas turbine comprises the step of adjusting a plurality of blade wheels and/or a plurality of guide blades in the exhaust gas turbine.

25. The drive train of claim 18, wherein the variable describing the charging of the internal combustion engine comprises a charging pressure ($p_{BP}$).

26. The drive train of claim 18, wherein the reference variable describing the charging of the internal combustion engine comprises a predetermined reference charging pressure ($p_{BP\_soll}$).

* * * * *